United States Patent Office 3,372,461
Patented Mar. 12, 1968

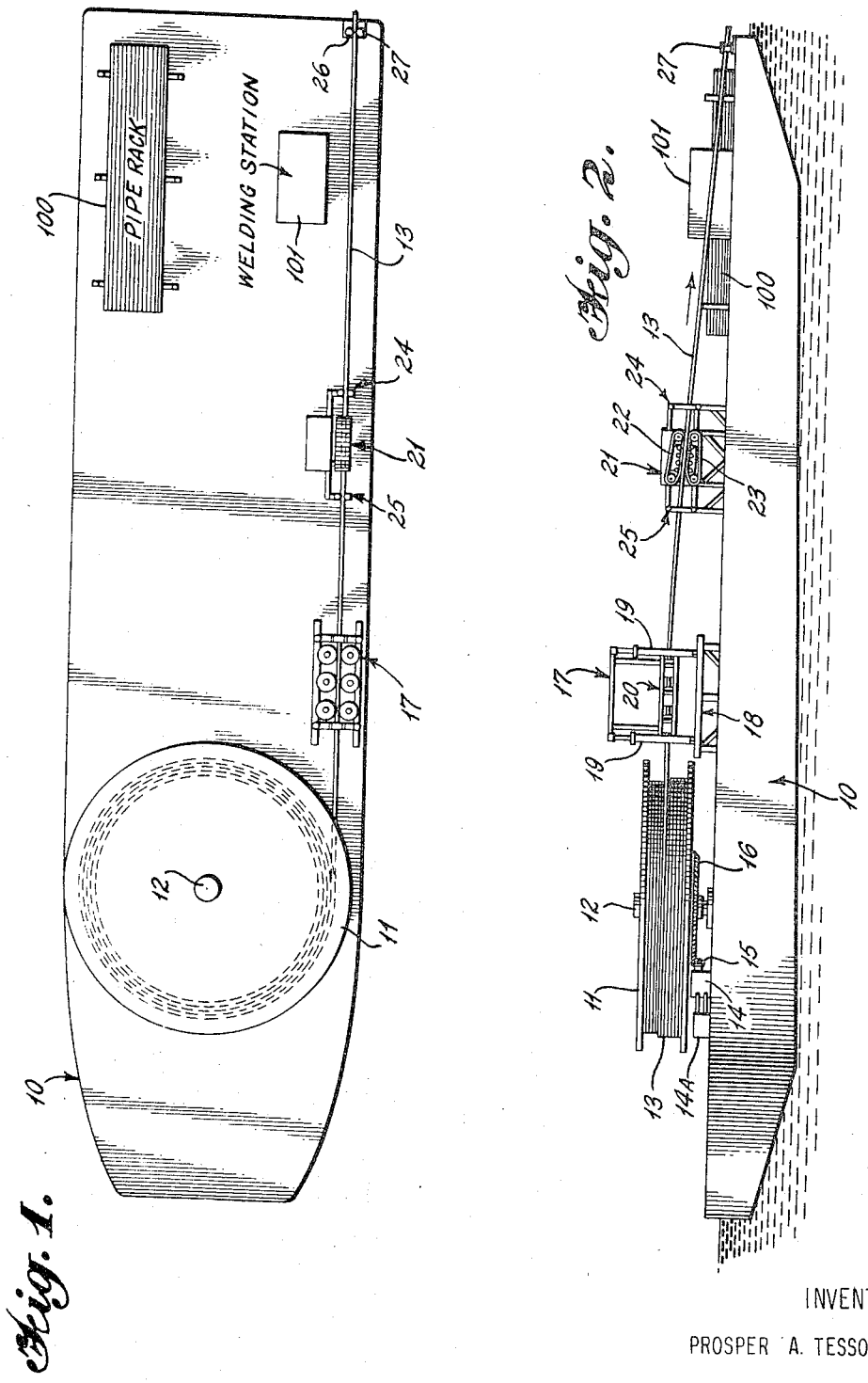

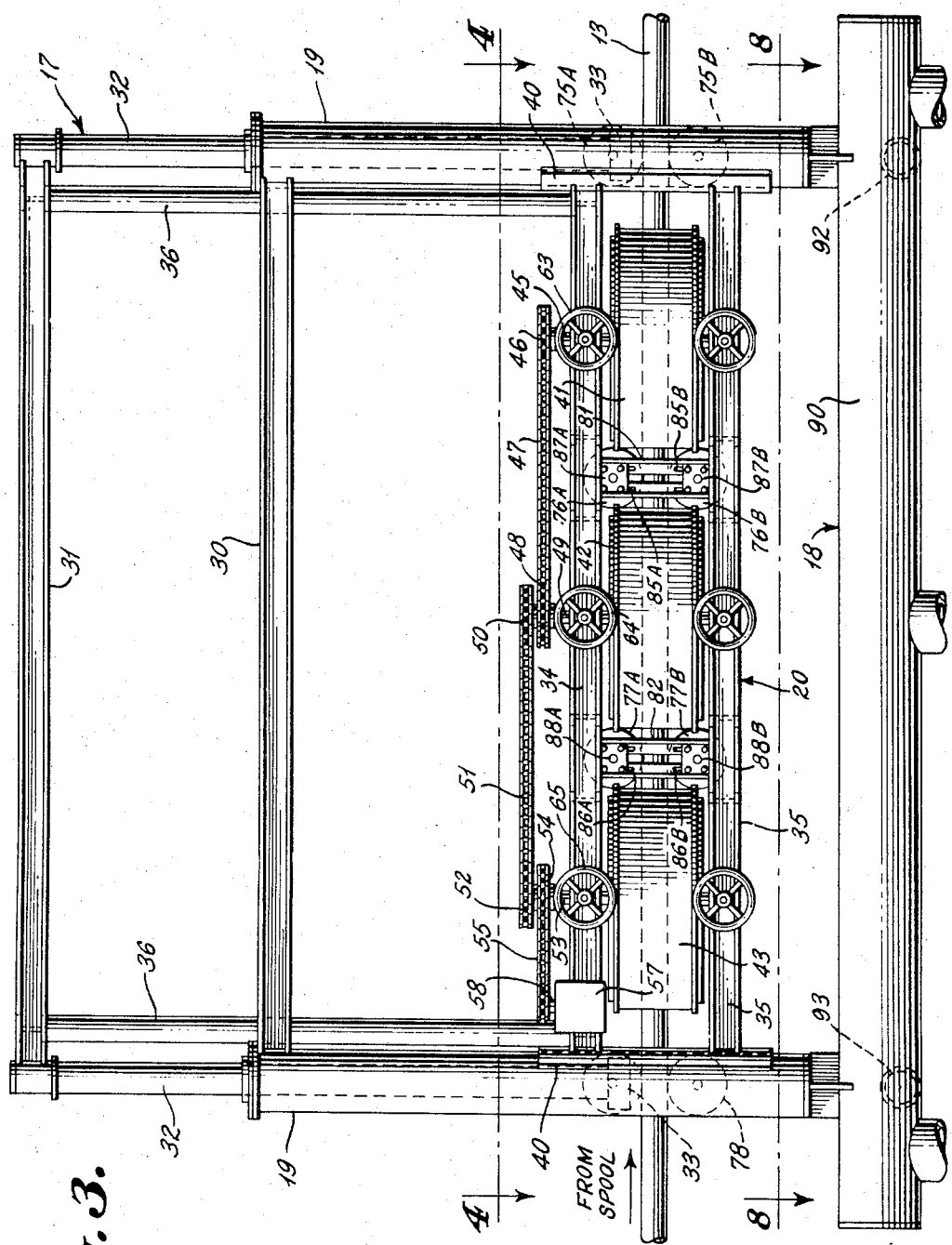

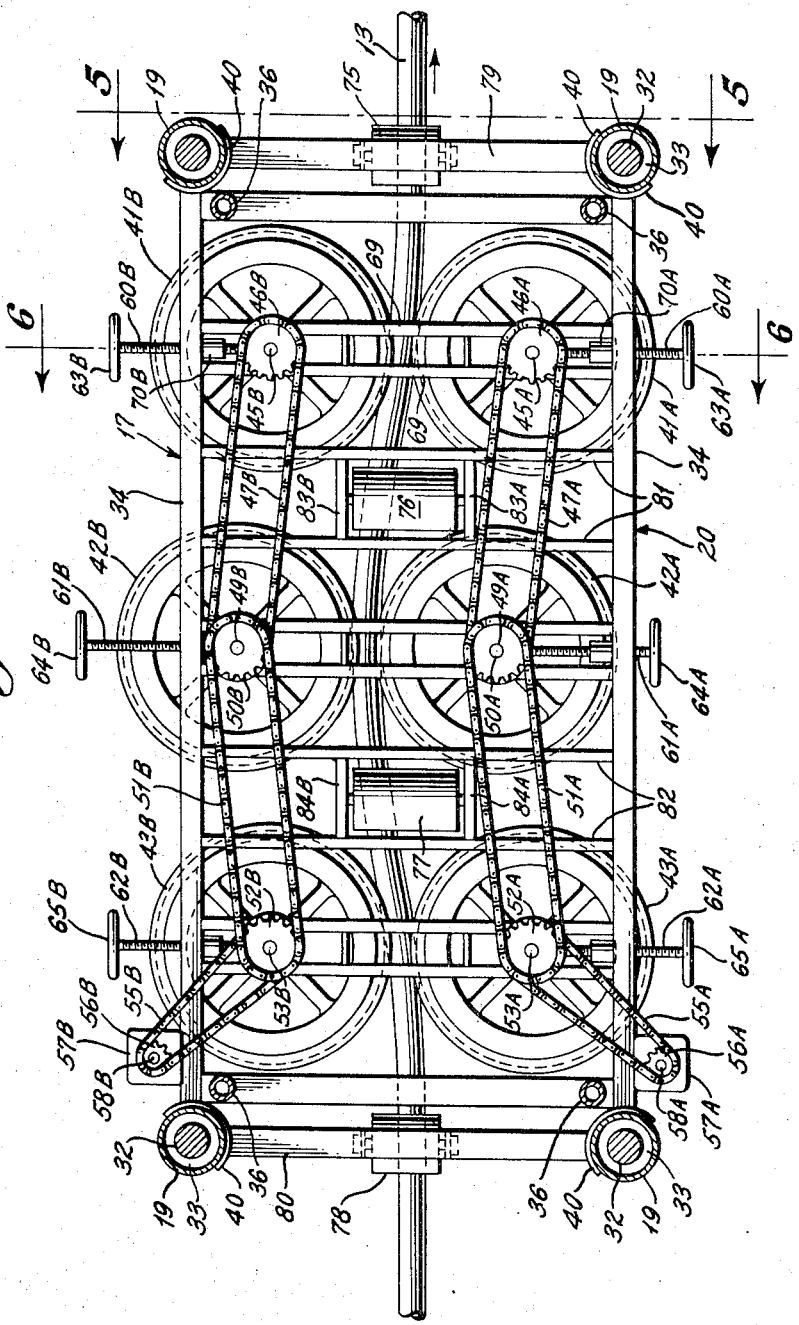

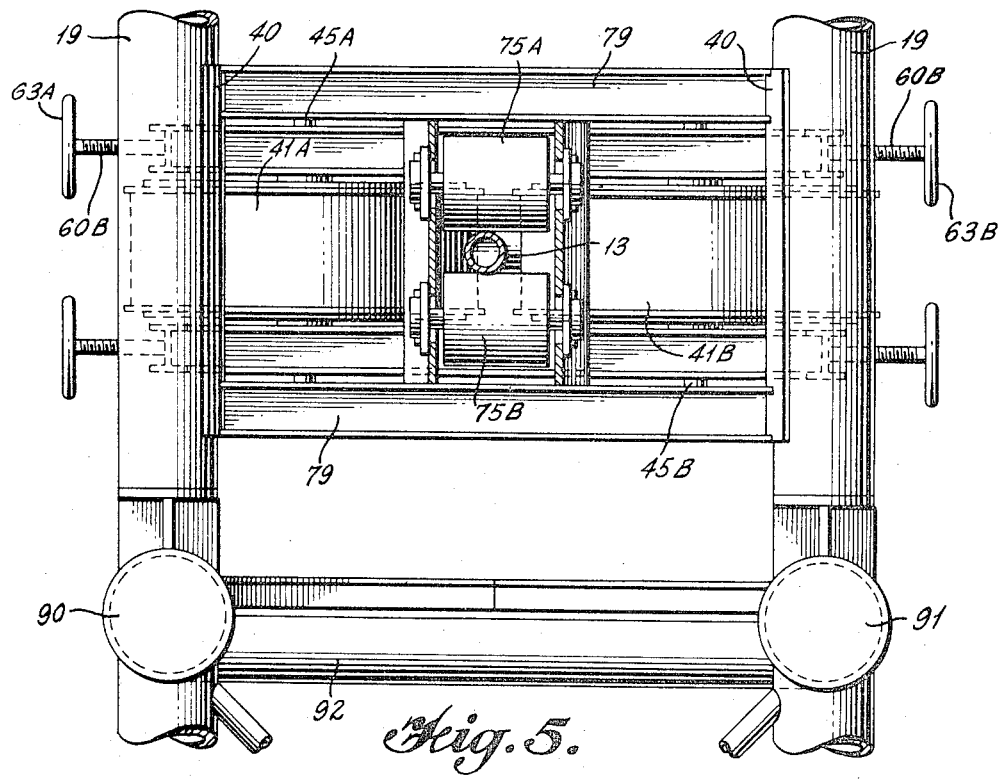
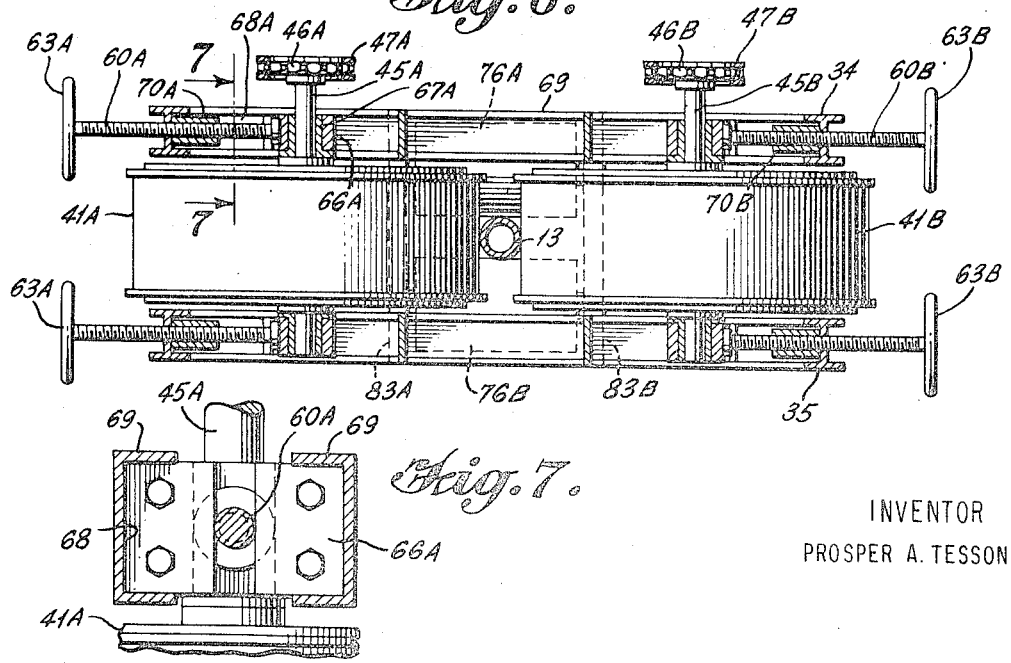

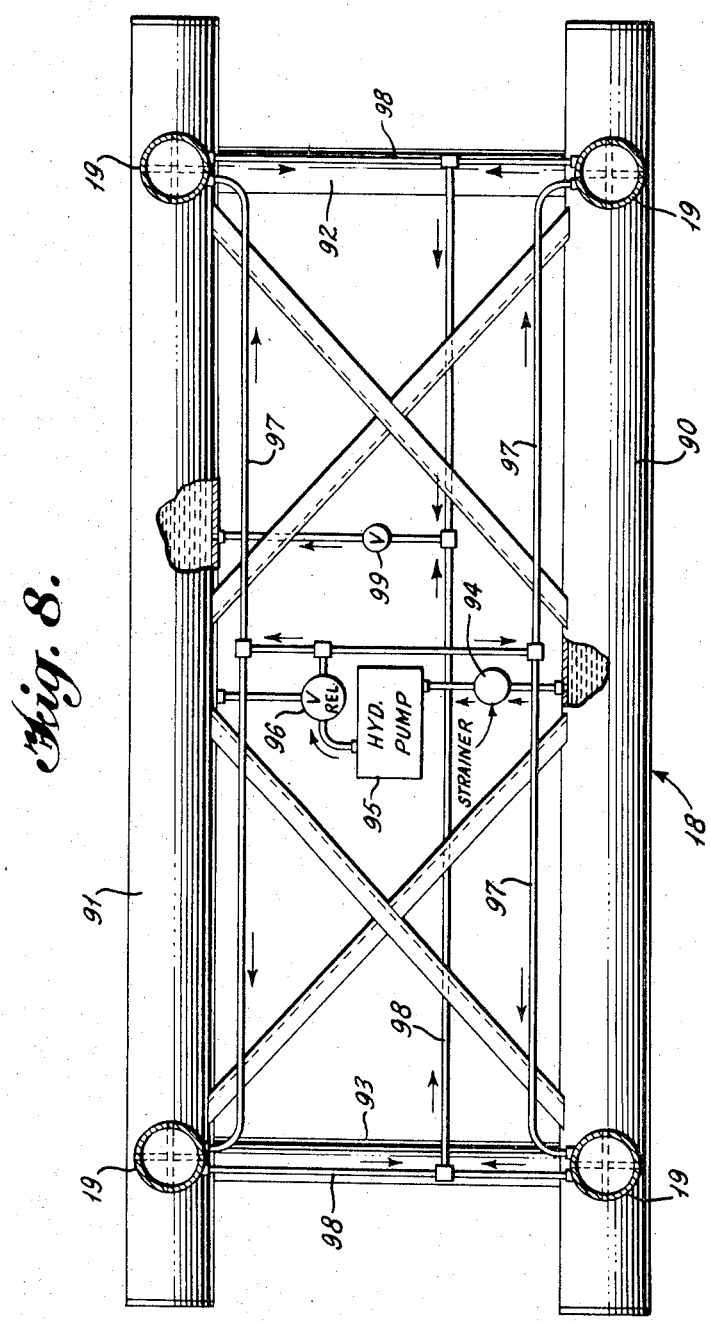

3,372,461
METHOD OF LAYING PIPE LINE
Prosper A. Tesson, Metairie, La., assignor to Gurtler, Herbert & Co., Inc., New Orleans, La., a corporation of Louisiana
Original application July 25, 1962, Ser. No. 212,368, now Patent No. 3,237,438, dated Mar. 1, 1966. Divided and this application Aug. 12, 1965, Ser. No. 536,245
2 Claims. (Cl. 29—429)

This application is a division of my copending application Ser. No. 212,368, filed July 25, 1962, now Patent No. 3,237,438.

This invention relates to the laying of relatively long lengths of metal pipe and particularly to a method of effecting reeling and unreeling of such pipe.

In laying long lines of metal pipe for such uses as the gathering of oil and gas from wells beneath the water in the Gulf of Mexico, and for providing utilities such as fresh water to such wells, it has been conventional in the past to join sections of the pipe together during the course of the laying operation. That is, a large number of rectilinear lengths of the pipe are supported on a barge and the sections individually welded together as the pipe is laid out from the barge. Of course the paying-out operation must then be interrupted periodically during its course so that new lengths of pipe may be welded to the string or line. Further, welders and their relatively bulky equipment must accompany the pipe laying crew during its entire operation. Weather conditions may unduly complicate the pipe laying in such conventional fashion, particularly since the operation is extended by the necessity for joining sections of pipe as the operation progresses.

A main object of this invention is to provide for a method of laying a continuous length of pipe without the necessity for any joining operations during the laying operation.

This general objective is in part achieved by winding the pipe onto a large reel or drum which is mounted on the barge from which the pipe is to be paid out, and then unwinding the continuous length of pipe from the reel during the laying operation. This broad idea was previously disclosed in British Patent No. 601,103 wherein it is suggested that lengths of pipe be joined together at the manufacturing plant and coiled onto a drum which then may be moved to the marine location and the pipe unwound therefrom by fixing one end of the pipe and towing the drum away from that end. The British patent further suggests the provision of leverage for bending the pipe in forming the coil on the drum, as by mechanical means in the form of guide rollers mounted on a traveler running on rails parallel to the axis of the drum. It further discloses that the coil or deflection may be removed from the pipe by the forces exerted by the water during the laying operation. While such a method of removing deflection might be satisfactory in very deep water, particularly in wartime conditions where it is not extremely important that the pipeline be quite straight, it is not satisfactory in commercial pipe laying, particularly in relatively shallow water such as in the Guf of Mexico. Moreover, even if water forces were sufficient to remove all of the deflection from the pipe, the difficulty of properly laying a corkscrew-form pipeline will be evident.

It is an object of the invention, therefore, to remove all of the curvature from the pipe resultant from the reeling operation, during unreeling and before the pipe is laid.

A further object of the invention is to prevent any damage to the pipe or any coating thereon, as well as to inhibit any substantial change in wall thickness during the winding operation. This objective is achieved by pre-bending the pipe to the approximate curvature of the reel before it is wound thereon.

The pre-bending, as well as the reverse deflection, are accomplished in the method of the invention by an apparatus positioned adjacent the reel which includes a plurality of pairs of rolls through which the pipe passes. One pair of such rolls is offset from a line drawn through the centers of the spaces between the rolls of two additional pairs of rolls mounted at opposite sides of the offset pair along the line of travel of the pipe. The amount of the offset is correlated with the distances between the rolls to provide a deflection or curvature generally corresponding to that of the drum, during the winding operation. During unwinding the offset pair of rolls is moved to the opposite side of said center line so that the deflection may be removed from the pipe.

Though the major deflection of the pipe during the reeling operation is in a plane perpendicular to the axis of the drum, it will be appreciated that a certain amount of deflection in a plane parallel to the axis must also occur. The apparatus of the invention therefore desirably includes means for imparting a deflection to the pipe in this direction during the reeling operation and for removing that deflection during the unreeling operation.

The method and apparatus of the invention will now be more fully described in conjunction with drawings showing a preferred embodiment thereof.

In the drawings:
FIG. 1 is a plan view of the apparatus of the invention shown mounted on a barge;
FIG. 2 is a front elevational view of the apparatus of FIG. 1;
FIG. 3 is an elevational view on a larger scale of the bending and level winding portion of the apparatus of the preceding figures;
FIG. 4 is a sectional view taken along line 4—4 of FIG. 3;
FIG. 5 is a sectional view taken along line 5—5 of FIG 4;
FIG. 6 is a further sectional view taken along line 6—6 of FIG. 4;
FIG. 7 is a detail sectional view taken along line 7—7 of FIG. 6; and
FIG. 8 is a sectional view taken along line 8—8 of FIG. 3 and showing schematically the power source and associated connections for the level winding portion of the apparatus.

Referring now to FIGS. 1 and 2, a suitable barge for the reeling and unreeling operation is shown diagrammatically at 10. That barge supports a drum or reel 11 rotatable on a vertical shaft 12 to reel and unreel a continuous length of pipe 13. While the reel is shown mounted on a vertical shaft, it will be evident that it might also be mounted on a horizontal shaft, with appropriate changes in the positions of the other elements of the apparatus. The pipe is suitably of steel and may be of any standard outside diameter such as two inches to six inches, and even higher. Though steel pipe is normally used in conjunction with oil and gas wells in the Gulf of Mexico, it will be understood that the invention is not limited to the use of any particular metal but has application in the laying of any relatively inflexible metal pipe which is stretched beyond its elastic limit and assumes a permanent structural deflection when it is wound on a reel. In marine pipe laying the pipe will normally be covered with a protective coating, such as that known as "Extrucoat" and provided on lengths of steel pipe by Republic Steel Company. It is understood that this coating consists of a soft mastic inner coating covered by an extruded polyethylene outer coating.

As indicated above, it has been found, contrary to what might be expected, that not only is the steep pipe not damaged by the reeling and unreeling operation contemplated by the invention, but the coating is not damaged. In particular, it has been found possible to reel and unreel coated steel pipe of diameters as high as six inches and with wall thicknesses equal to that of Schedule 160 pipe without hardening of the pipe or other damage to the pipe or its coating and without excessive distortion of the circular section of the pipe. In fact it has been found that the distortion amounts to less than 2% of the pipe diameter, which is less than the effective manufacturing tolerance of the pipe.

The reel 11 is rotated during at least the reeling operation by a hydraulic motor schematically shown at 14 which drives a spur gear 15 meshing with a bevel gear 16 fixed to the reel shaft 12. The motor 14 may be supplied with power from a suitable hydraulic pump generally indicated at 17.

During the reeling and unreeling operations the pipe passes through a combined bending and level wind apparatus generally shown at 17 and which includes a supporting platform 18 mounted on the deck of the barge. The platform 18 carries a set of standards or posts 19 supporting a frame generally indicated at 20, which is reciprocable vertically with respect to the posts 19. Mounted on the frame 20 are a plurality of sets of rollers which confine and bend the pipe 13 during both the winding and unwinding operations.

At the right hand side of the bending and level wind apparatus 17 (as shown in FIGS. 1 and 2) there is mounted a tensioning device and brake 21. This brake may be employed to maintain tension on the pipe 13 as it is wound and when it is stored on the reel 11, so as to prevent the pipe from unraveling or uncoiling. It is suitably formed by a pair of tractor half tracks 22 and 23 to which power may be supplied by any suitable means (not shown), to tend to cause movement of the half tracks and hence the pipe 13 in either of the two possible opposite directions. The tensioning apparatus may also mount two pairs of rolls 24 and 25, at opposite sides thereof, which are designed to restrict the pipe against lateral movement.

Finally, at the end of the barge from which the pipe is uncoiled, there is provided a pair of fair lead rolls 26 and 27 which likewise restrain the pipe against lateral movement. It will be noted that as the pipe is paid off or unwound from the reel 11, it assumes a gradual slope toward the water, as it approaches the afterend of the barge. This insures that the pipe will assume the desirable catenary curve during the laying operation.

Referring now particularly to FIGS. 3 and 4, the bending and level wind apparatus 17, as indicated, includes a frame 20 reciprocable with respect to supporting posts 19. In addition to being supported by the platform 18, the four posts 19 have a set of upper frame members 30 which join the posts together at their upper ends. The frame 20 includes a set of upper supporting frame members 31 attached to the upper ends of piston rods 32 which are reciprocable within the posts 19. The lower ends of the piston rods are fixed to pistons shown at 33 and which form part of hydraulic motors. The apparatus for supplying power to these motors will be described hereinafter, but suffice it to say at this point that the motors operate to lift the pistons 33 from positions adjacent the lower end of the posts to positions adjacent the upper ends thereof. The piston rods 32 consequently move with the pistons and raise the frame members 31 to cause upward movement of the frame. When the direction of movement of the pistons is reversed, the pistons 33 begin downward movement, carrying the piston rods and the frame therewith.

The frame 20, in addition to the upper frame members 31, includes sets of lower frame members 34 and 35 which are parallel to each other but spaced apart vertically. The upper set 34 of these frame members is supported from the upper frame members 31 by vertically-extending rods 36. The sets of frame members 34 and 35 are both fixed to slide members 40 which embrace the posts 19 and are movable with the frame with respect to such posts.

The frame 20 supports three pairs of rolls 41–43 which are rotatable about vertical axes and are operative to pre-bend the pipe 13 to approximately the curvature of the reel as the pipe is wound thereon. These rolls are also operative, as will be explained, to reverse bend the pipe when it is unwound from the reel, and in fact the rolls are shown in the reverse bending position in the drawings.

The pair of rolls 41 are respectively labelled 41A and 41B in FIG. 4 and are respectively fixed to shafts 45A and 45B. Each of the shafts carries a sprocket 46 which engages a chain 47. These chains are respectively engaged with sprockets 48 mounted on shafts 49, which shafts are respectively fixed to the rolls 42. The shafts 49 carry additional sprockets 50 which engage chains 51. These chains are in turn engaged with sprockets 52 which are fixed to the shafts 53 of the rolls 43. The shafts 53 also carry sprockets 54 engaged by chains 55 which are driven by sprockets 56 in turn driven by hydraulic motors 57.

It will be seen from the above description that rotation of the shafts 58 of hydraulic motors 57 in one direction will cause rotation of the rolls 41–43 in one sense, while rotation of shafts in the opposite direction will cause rotation of the rolls in the opposite sense.

The rolls of each pair of rolls 41–43 are spaced apart sufficiently to embrace the pipe 13 therebetween. Though the rolls are shown as having substantially flat surfaces, they have concave surfaces to embrace the pipe and it is desirable that concave surfaces be provided especially for large diameter and large wall thickness pipe. Such surfaces may be provided by concave rubber inserts which can be slipped onto the rolls.

It will be seen from FIG. 4 especially that the center pair of rolls 42 is displaced from the two outer pairs of rolls 41 and 43. That is, a line passing through the centers of the spaces between the rolls 41 and the rolls 43 will be offset from the center of the space between rolls 42. As a result, the pipe will be bent during its passage through the bending and level wind apparatus 17 along a line extending perpendicularly to the axis of the drum 11. The apparatus as shown in the drawings is positioned to remove a deflection or curvature from the pipe in the unwinding operation, so that the rolls 42 are displaced upwardly as shown in FIG. 4 from the rolls 41 and 43. When pipe is being wound on the reel, the rolls 42 must be displaced in the opposite direction from the line between the centers of the spaces between rolls 41 and rolls 43.

As has been indicated, the apparatus of this invention is designed to accept pipe of several different diameters. It is also necessary to provide for adjustment of the positions of the rolls 42 for initial bending and for reverse bending in the winding and unwinding operations, respectively. For this purpose, adjustment means are supplied for each of the pairs of rolls. While such adjustment means could be designed to move the rolls of each pair through operation of a single control, the embodiment disclosed herein employs separate controls for each roll.

As seen in FIG. 4, such adjustment means includes a screw 60 for each of rolls 41, a screw 61 for each of rolls 42 and a screw 62 for each of rolls 43. These screws are respectively provided with handles 63–65. Referring to FIG. 6, in fact it will be seen that each roll is provided two adjustment screws and handles. Since they are identical, and in fact the adjustment screws and handles for all of the rolls are identical, only one will be described in detail. The screw 60A is operative to move a bearing block 66A which supports the bushing 67A of roll shaft 45A. That bearing block is movable in a slot 68A formed by facing C-shaped channel members 69 in the frame member 34. The end of the screw 60A is rotatably connected to the bearing block 66A, while a portion of the screw threadedly engages a threaded collar 70A fixed to the channed members. Through rotation of the handles 63A, therefore, it is possible to move the shaft 45A, and hence the roll 41A, to the right or left of FIG. 6. It will be evident that the upper and lower adjustment screws are rotated together to accomplish this purpose.

During the the winding operation it is also desirable to impart a deflection to the pipe 13 in the vertical direction, or along the axis of the reel 11, so that the pipe may be wound in elliptical fashion on the reel. This bending operation is accomplished in part through use of sets of fair lead rolls indicated in FIG. 4 at 75-78. The rolls 75 and 78 are mounted at opposite ends of the frame 20 on cross bars 79 and 80, respectively, supported by the slide members 40. The center rolls 76 and 77 are supported at opposite sides of the center rolls 42 by cross frame members 81 and 82 which carry bracket members 83 and 84. These bracket members are provided with slots 85 and 86 so that the bearings 87 and 88 may be moved toward and away from each other to allow different pipe thicknesses to be handled.

All of the fair lead rolls 75-78 are mounted so that a straight horizontal line passes through the centers of the spaces between the rolls of each pair. Also, none of these rolls is driven during operation except by the motion of the pipe 13. Like the power driven rolls 41-43, however, these rolls may be provided with concave inserts, if desired, to protect the pipe during its movement between them.

The vertical or axial bending of the pipe during the reeling and unreeling operations is also effected by vertical movement of the entire frame. As indicated, such movement is caused by hydraulic motors driving pistons 33 mounted in the supporting posts 19. Referring now to FIG. 8, the source of hydraulic fluid for operation of these motors will be described. The platform 18 is composed in part of a pair of longitudinally extending pipes 90 and 91 and a pair of cross pipes 92 and 93, These pipes are all interconnected and serve as a reservoir for hydraulic fluid. The fluid is pumped from the reservoir through a strainer 94 to remove foreign elements therefrom, by a hydraulic pump 95. The outlet of the pump passes through a release valve 96 to a system of pipes 97 connected to the inlets of the hydraulic motors 33. The output ports of the motors 33 are in turn connected by a system of pipes 98 through a valve 99 back to the reservoir formed by pipes 90-93.

It will be evident that when the pump is actuated and the valves 96 and 99 are in the proper positions, the motors 33 will be provided with fluid under pressure operative to raise or lower the frame 20 and therefore the sets of bending rolls. During the bending operation, by virtue of the straight line alignment of the fair lead rolls 75-78, a deflection in the vertical or axial direction is imparted to the pipe while during the unreeling operation, that deflection is removed from the pipe. As a result, the pipe exits from the bending and level wind apparatus 17 in a rectilinear configuration suitable for laying the pipe onto the earth surface beneath the water.

The controls for the various hydraulic motors may appropriately be located at a control station (not shown) adjacent the reel, as well as the bending and level wind apparatus, so that a single operator may control winding and unwinding. Such operator may, if desirable, control the hydraulic motors 33 in such fashion as to insure that the pipe does not rub against the flanged ends of the reel 11, as by maintaining the bending and level wind apparatus spaced slightly from the coil of pipe currently being wound or unwound, when that coil is adjacent one of the flanges.

It will be evident that the power for unreeling the pipe from the reel 11 could be supplied in several different ways. For instance, as has already been indicated, the radial-bending reels 41-43 are supplied with power from hydraulic motors 57 and this power could be employed to unreel the pipe. Further, the tensioning or braking apparatus 21 is suitably supplied with motive power and could be employed for this purpose. Also, the end of the pipe could be fixed and the barge pulled, as by tugs and the like, along the path which the layed pipe is to follow, so that the pipe would be pulled off the reel by the motion of the barge. Finally, it would be possible to use winches for this unreeling purpose.

The tension or braking apparatus 21 may of course be of any suitable construction and is desirably employed particularly to maintain tension on the pipe as it is wound on the reel and during storage between winding and unwinding operations, so that the pipe will not tend to unwind from the reel.

As has been indicated, the apparatus of the invention is particularly designed to form a long line of pipe which may be as long as the entire pipe length to be laid, to wind it on a reel or drum and then to unwind it therefrom during the laying operation. All of these functions may be performed from the barge 10. The pipe in standard lengths as received from the factory may be stacked in a pipe rack generally shown at 100 and may be removed therefrom to a welding station generally shown at 101. The respective lengths of pipe can then be joined together to form the line and the pipe line be pre-bent and reeled onto the reel 11 during this joining operation. When a line of sufficient length has been formed, the welding operation may be stopped and the barge towed to the location where the pipe line is to begin. The only operations necessary thereafter consist of unwinding and reverse bending the pipe while it is being laid. It will be evident that it is of very great advantage to be able to perform all of the joining and reeling operations prior to any unreeling, since the former operations can readily be performed in port, and since the laying operation will then not be interrupted for joining.

It will further be evident that it is of great advantage to be able to do the joining and unreeling operations on the tug itself, rather than to have the reel supplied with a continuous line of pipe at the factory. Particularly because of the extreme size of the reel, which is 40 feet in diameter in one actual embodiment of the invention, it would not be convenient to transport a pipe-loaded reel from the plant which supplies the pipe, to the location of the barge. With the apparatus and method of this invention it is not necessary to preload the reel before shipment of pipe, since the pipe can be shipped in the ordinary rectilinear separate lengths as by railroad car, barge and the like, and then be assembled into the line and reeled onto the drum on the barge.

Though only one reel is shown mounted on the barge 10 in the drawings of this application, it will be evident that more than one reel could be employed. In fact, such reels could be stacked one above the other and used either to pay out a plurality of lines simultaneously, or to be operated sequentially to lay a much longer line than might be possible with one reel of a given size. It will also be evident that a single reel may be employed to wind and unwind a plurality of lines of pipe simultaneously since the various bending rolls may readily be adjusted to accommodate all of the lines of pipe simultaneously.

It has been indicated that the pipe is desirably bent to approximately the curvature of the reel before it is wound thereon. This may be done by imparting a deflection to the pipe somewhat greater than this curvature to compensate for the slight elasticity of the pipe and so that it will assume the proper curvature on the reel. Also, the bending could be somewhat less than the actual curvature of the reel and the final amount of bending be accomplished through the winding operation itself. It is most desirable, however, that at least most of the bending be accomplished before the pipe is wound on the reel.

It will be obvious that many other minor modifications may be made in the apparatus particularly disclosed herein. The invention is therefore not to be considered limited to the preferred embodiment shown in the drawings but rather only by the scope of the appended claims.

I claim:
1. The method of laying long lines of relatively inflexible metal pipe including the steps of
   progressively joining together lengths of pipe to form a long line therefrom,
   winding the pipe line onto a cylindrical reel as the lengths of pipe are joined thereto,
   bending the pipe to approximately the curvature of the reel before winding it thereon,
   later moving the reel along the path in which the line is to be laid, while unwinding the line from the reel and simultaneously reverse bending the pipe to substantially rectilinear configuration.

2. The method of claim 1 including the steps of bending the pipe in the direction of the axis of the reel before winding it thereon,
   and reverse bending the pipe in the direction of the axis of the reel after unwinding it therefrom.

References Cited

UNITED STATES PATENTS

| 928,220 | 7/1909 | Schneider | 72—175 X |
| 3,116,781 | 1/1964 | Rugeley et al. | 72—160 |

FOREIGN PATENTS 601,103  4/1948  Great Britain.

CHARLIE T. MOON, *Primary Examiner.*